(12) United States Patent
Sugiyama et al.

(10) Patent No.: US 9,754,248 B2
(45) Date of Patent: Sep. 5, 2017

(54) TRANSACTION SYSTEM, INFORMATION PROCESSING METHOD, AND PROCESSING DEVICE

(71) Applicant: Seiko Epson Corporation, Tokyo (JP)

(72) Inventors: Yuichi Sugiyama, Matsumoto (JP); Keigo Mori, Matsumoto (JP); Shigeo Tajima, Matsumoto (JP); Masahiro Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 9 days.

(21) Appl. No.: 14/798,649

(22) Filed: Jul. 14, 2015

(65) Prior Publication Data
US 2016/0042335 A1   Feb. 11, 2016

(30) Foreign Application Priority Data

Aug. 8, 2014   (JP) ................................. 2014-162379

(51) Int. Cl.
*G06Q 20/00* (2012.01)
*G06Q 20/20* (2012.01)
*G07G 1/14* (2006.01)
*G07G 1/00* (2006.01)

(52) U.S. Cl.
CPC ......... *G06Q 20/202* (2013.01); *G06Q 20/208* (2013.01); *G07G 1/0036* (2013.01); *G07G 1/14* (2013.01)

(58) Field of Classification Search
CPC .. H04N 1/00; G06K 7/08; G08G 1/14; G06Q 20/202

USPC ............................ 358/1.15; 235/383; 705/21
See application file for complete search history.

(56) References Cited

U.S. PATENT DOCUMENTS

| | | | |
|---|---|---|---|
| 8,789,749 B2* | 7/2014 | Besecker | G06Q 20/208 235/375 |
| 9,224,138 B2* | 12/2015 | Sugiyama | G07F 17/42 |
| 2005/0211772 A1* | 9/2005 | Nakamura | G06Q 10/087 235/383 |

(Continued)

FOREIGN PATENT DOCUMENTS

| | | |
|---|---|---|
| JP | 2006-293540 A | 10/2006 |
| JP | 2008-139944 A | 6/2008 |

*Primary Examiner* — Seye Iwarere
(74) *Attorney, Agent, or Firm* — Foley & Lardner LLP (57) ABSTRACT

A POS terminal 8 in a transaction system 1 transmits control data instructing executing a transaction-related process during a transaction; a recording device 12 receives the control data, executes a process based on the control data, transmits transaction information based on the control data and transaction identification information identifying the transaction information, and outputs a 2D code representing the transaction identification information; a terminal 14 reads the transaction identification information from the 2D code output by the recording device 12, and transmits the transaction identification information that was read and a customer ID, which is identification information to store; and a control server 10 receives the transaction information and transaction identification information from the recording device 12, receives the transaction identification information and customer ID from the terminal 14, and relationally stores the transaction information and customer ID when both of the received transaction identification information match.

10 Claims, 5 Drawing Sheets

(56) References Cited

U.S. PATENT DOCUMENTS

| | | | | |
|---|---|---|---|---|
| 2008/0251582 A1* | 10/2008 | Nguyen | ............... | G06Q 20/20 235/449 |
| 2008/0255960 A1* | 10/2008 | Nguyen | ............ | G06Q 30/0212 705/14.14 |
| 2013/0268380 A1* | 10/2013 | Hussie | .................. | G06Q 20/20 705/21 |
| 2014/0337117 A1* | 11/2014 | Besecker | ............. | G06Q 20/208 705/14.38 |
| 2015/0138592 A1* | 5/2015 | Yokoyama | .............. | G07G 1/00 358/1.15 |
| 2015/0193762 A1* | 7/2015 | Sugiyama | .............. | G07F 17/42 705/24 |
| 2015/0287013 A1* | 10/2015 | Terashima | .......... | G06Q 20/209 705/24 |
| 2015/0348005 A1* | 12/2015 | Inagawa | ........... | G06Q 20/0453 705/44 |
| 2015/0356537 A1* | 12/2015 | Yamada | .............. | G06Q 20/202 705/21 |
| 2015/0356538 A1* | 12/2015 | Okada | ................. | G06Q 20/204 705/17 |

\* cited by examiner

TRANSACTION SYSTEM, INFORMATION PROCESSING METHOD, AND PROCESSING DEVICE

Priority is claimed under 35 U.S.C. §119 to Japanese Application no. 2014-162379 filed on Aug. 8, 2014 which is hereby incorporated by reference in their entirety.

BACKGROUND

1. Technical Field

The present disclosure relates to a transaction system, an information processing method, and a processing device.

2. Related Art

Technology enabling a specific server to relate information related to a transaction to specific identification information such as a user ID when a customer transaction is processed is known from the literature.

JP-A-2008-139944, for example, discloses a POS terminal that sends transaction-related information to a specific server, and generates a code including the address of the specific server. The customer can read the code displayed by the POS terminal on a terminal device. By reading the code, the terminal sends specific identification information to a specific server. The specific server then relationally stores the transaction-related information that is received with the specific identification information.

However, the POS terminal requires specialized devices or functions to relate the transaction-related information to specific identification information in this system. A POS terminal generally uses the functions of multiple programs during a transaction to execute transaction-related processes, and modifying plural programs is required to incorporate the specialized devices or functions. Minimizing the addition of specialized devices or functions to the POS terminal is therefore desirable.

SUMMARY

The present disclosure is directed to this problem, and an objective of the disclosure is to enable relating specific identification information to transaction-related information without providing the POS terminal with a specialized or dedicated device or function.

To achieve the foregoing objective, a transaction system according to the disclosure includes: a POS terminal that transmits control data instructing executing a transaction-related process during a transaction; a processing device that receives the control data from the POS terminal, executes a process based on the control data, transmits transaction information based on the control data and transaction identification information identifying the transaction information, and outputs a code representing the transaction identification information; a terminal that reads the transaction identification information from the code output by the processing device, and transmits the transaction identification information that was read and device identification information, which is identification information to store; and a control device that receives the transaction information and transaction identification information from the processing device, receives the transaction identification information and device identification information from the terminal, and relationally stores the transaction information and device identification information when the transaction identification information received from the processing device and the transaction identification information received from the terminal match.

Thus comprised, transaction-related information and specific identification information can be related without providing the POS terminal 8 with a specialized function.

In a transaction system according to another aspect of the disclosure, the processing device preferably has a recording unit that records, and outputs the code by the recording unit recording the code.

Thus comprised, the processing device can use the recording unit to output the code.

In a transaction system according to another aspect of the disclosure, the processing device preferably has a display unit that displays information, and outputs the code by the display unit displaying the code.

Thus comprised, the processing device can use the display unit to output the code.

In a transaction system according to another aspect of the disclosure, the processing device preferably stores the transaction information and transaction identification information when the transaction information and transaction identification information cannot be transmitted to the control device, and transmits the transaction information and transaction identification information when transmission is enabled.

When transmitting information to the control device is temporarily disabled, the processing device in this aspect of the disclosure can transmit the information after communication is restored.

In a transaction system according to another aspect of the disclosure, the control device preferably executes a specific process appropriate to the transaction based on the relationally stored transaction information and device identification information.

Thus comprised, the control device can execute a process appropriate to the transaction based on the relationally stored transaction information and device identification information.

Further preferably in a transaction system according to another aspect of the disclosure, the control device relationally stores the transaction identification information and device identification information if the difference between a transaction time based on the transaction information and a read time based on the time when the code was read is within a specific range when relationally storing the transaction information and device identification information.

Thus comprised, when one transaction and reading based on the one transaction occur within a specific period of time, the transaction information and device identification information based on the one transaction can be related.

Another aspect of the disclosure is an information processing method, including: a POS terminal transmitting control data instructing executing a transaction-related process during a transaction; a processing device receiving the control data from the POS terminal, executing a process based on the control data, transmitting transaction information based on the control data and transaction identification information identifying the transaction information, and outputting a code representing the transaction identification information; a terminal reading the transaction identification information from the code output by the processing device, and transmitting the transaction identification information that was read and device identification information, which is identification information to store; and a control device receiving the transaction information and transaction identification information from the processing device, receiving the transaction identification information and device identification information from the terminal, and relationally storing the transaction information and device identification information when the transaction identification information received from the processing device and the transaction identification information received from the terminal match.

Thus comprised, transaction information and specific identification information can be related without providing the POS terminal with a specialized function.

Another aspect of the disclosure is a processing device that receives control data from a first external device, executes a process based on the control data, transmits transaction information based on the control data and transaction identification information identifying the transaction information to a second external device, and outputs a code representing the transaction identification information.

Thus comprised, transaction information and specific identification information can be related without providing the POS terminal with a specialized function.

Other objects and attainments together with a fuller understanding of the disclosure will become apparent and appreciated by referring to the following description and claims taken in conjunction with the accompanying drawings.

DESCRIPTION OF EMBODIMENTS

A preferred embodiment of the present disclosure is described below with reference to the accompanying figures.

Figure 1:
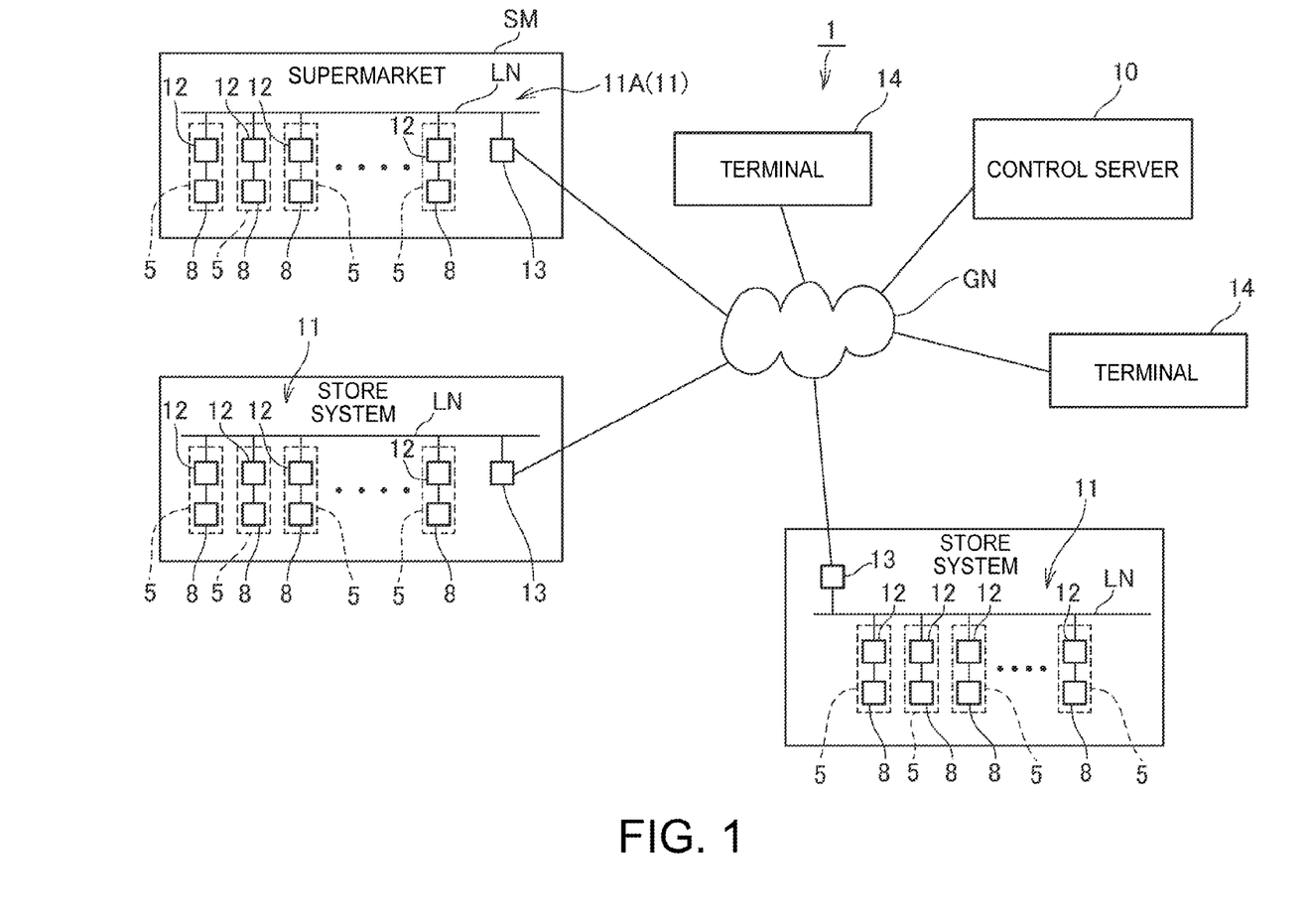
FIG. 1 illustrates the configuration of a transaction system according to a preferred embodiment of the disclosure.

FIG. 1 shows the configuration of a transaction system 1 according to a preferred embodiment of the disclosure.

As shown in FIG. 1, the transaction system 1 includes a control server 10 (control device, second external device). A plurality of store systems 11 connect to the control server 10 through the Internet or other network GN. The store system 11 is a system that is used in retail businesses such as supermarkets, convenience stores, department stores, and restaurants. The store system 11 has a function for producing receipts for customers of the business.

The store system 11 has one or more recording devices 12 (processing devices) for producing receipts. Each recording device 12 connects to a local area network LN deployed in the store. A network communication controller 13 including a communication device such as a network router or modem connects to the local area network LN. The recording device 12 accesses the network GN through the network communication controller 13.

A POS terminal 8 connects to the recording device 12 in the store system 11. A POS application and printer driver are installed on the POS terminal 8. As described below, the POS terminal 8 controls the recording device 12 and produces receipts with the recording device 12 by functions of a POS application and printer driver.

One or more checkout counters are located in the business. A recording device 12 and a POS terminal 8 connected to the recording device 12 are installed at each checkout counter. A checkout counter is where a sale transaction with a customer is processed. A checkout clerk works at each checkout counter, and the POS terminal 8 controls the recording device 12 and produces receipts based on instructions from the checkout clerk.

In this embodiment of the disclosure, a system comprising a recording device 12 and POS terminal 8 installed at a checkout counter is called a POS system 5. A POS system 5 including a recording device 12 and a POS terminal 8 is therefore installed at a checkout counter.

In the example shown in FIG. 1, the store system 11A is a system used in a supermarket SM. Plural checkout counters are set up in the supermarket SM. A recording device 12 and a POS terminal 8 are installed at each checkout counter. A customer purchasing a product in the supermarket SM completes a sale transaction at the checkout counter. The POS terminal 8 executes a payment process according to the transaction, and sends control data instructing producing a receipt to the recording device 12. Based on the received control data, the recording device 12 produces a receipt. The printed receipt is given to the customer.

As shown in FIG. 1, terminals 14 connect to the network GN. The terminal 14 is a tablet-like cell phone (a smartphone) owned by the customer. The terminal 14 simply needs to have the ability to execute the processes described below, and a tablet computer, for example, may be used as the terminal 14.

Figure 2:
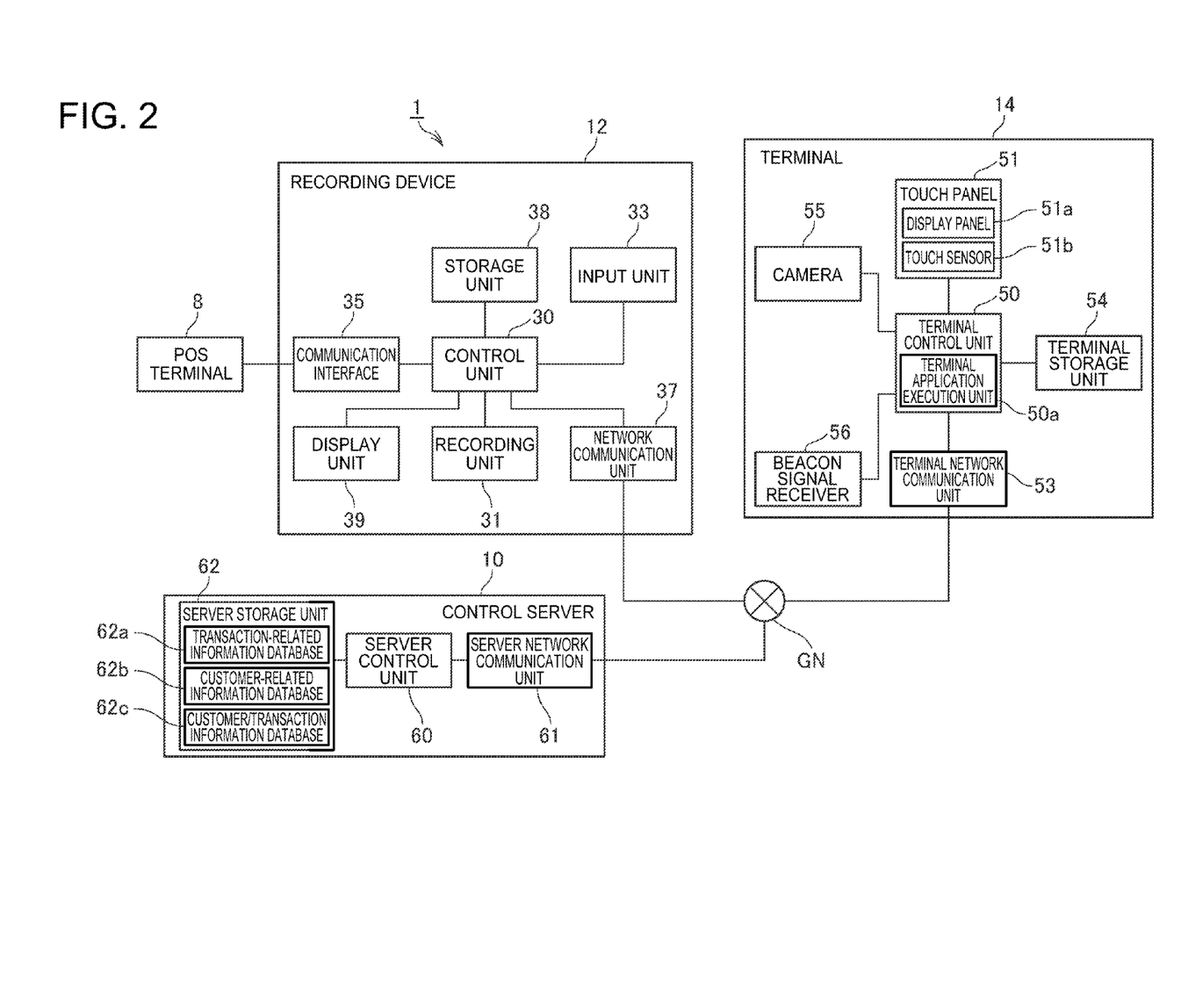
FIG. 2 is a block diagram illustrating the functional configuration of the transaction system.

FIG. 2 is a block diagram showing the functional configuration of the transaction system 1.

As shown in FIG. 2, the transaction system 1 includes a POS terminal 8, a recording device 12, a terminal 14, and a control server 10.

The recording device 12 is a thermal line printer that stores roll paper and records images by forming dots by a thermal line head on the roll paper.

As shown in FIG. 2, the recording device 12 includes a control unit 30, a recording unit 31, an input unit 33, a communication interface 35, a network communication unit 37, a storage unit 38, and a display unit 39.

The control unit 30 includes a CPU, ROM, RAM, and controls the recording device 12. The control unit 30 controls the recording device 12 by reading and running firmware stored in ROM, for example.

The recording unit 31 includes a thermal head, a roll paper conveyance mechanism, a cutter unit for cutting the roll paper, and other mechanisms and devices related to recording on the roll paper, and forms dots and records on the roll paper as controlled by the control unit 30.

The input unit 33 includes operating switches disposed to the cabinet of the recording device 12, detects operation of the operating switches, and outputs to the control unit 30. Based on input from the input unit 33, the control unit 30 detects the operations corresponding to the operated switch, and runs a process appropriate to the operation.

The communication interface 35 communicates with the POS terminal 8 according to a specific communication protocol as controlled by the control unit 30.

The network communication unit 37 communicates with other devices (such as the control server 10) connected to the network GN through the network GN according to a specific communication protocol as controlled by the control unit 30.

The storage unit 38 includes nonvolatile memory, and stores data.

The display unit 39 has an LCD display panel, for example, and displays information as controlled by the control unit 30.

As shown in FIG. 2, the terminal 14 includes a terminal control unit 50, a touch panel 51, a terminal network communication unit 53, a terminal storage unit 54, a camera 55, and a beacon signal receiver 56.

The terminal control unit 50 includes a CPU, ROM, RAM, and other peripheral circuits and controls the terminal 14.

The touch panel 51 includes a display panel 51a disposed to the front of the terminal 14, and a touch sensor 51b disposed over the display panel 51a. The display panel 51a is a display such as an LCD panel or OLED panel. The touch sensor 51b is a capacitive or pressure sensitive sensor, detects the operator's touch operations with a finger or stylus, and outputs to the terminal control unit 50.

The terminal network communication unit 53 communicates with devices connected to the network GN (such as the control server 10) through the network GN according to a specific wireless communication protocol as controlled by the terminal control unit 50.

The camera 55 includes an imaging element such as a CCD image sensor or CMOS image sensor, a objective lens group, and a lens drive unit that drives the objective lenses to adjust the zoom or focus, for example, and takes pictures. The camera 55 generates photographic image data based on the captured image, and outputs to the terminal control unit 50.

The terminal storage unit 54 includes nonvolatile memory and stores data.

The beacon signal receiver 56 receives a beacon signal by wireless communication and outputs information contained in the beacon signal to the terminal control unit 50. The terminal control unit 50 then executes a specific process described below based on input from the beacon signal receiver 56.

A specific application (referred to below as a terminal application AP) is preinstalled to the terminal 14. The terminal control unit 50 of the terminal 14 includes a terminal application execution unit 50a that executes processes by functions of the terminal application AP. A process executed by the terminal application execution unit 50a is described further below.

The control server 10 is a server device that connects to the network GN, and includes a server control unit 60, a server network communication unit 61, and a server storage unit 62.

The server control unit 60 includes CPU, ROM, RAM, and other peripheral circuits, and controls the control server 10.

The server network communication unit 61 communicates with devices connected to the network GN through the network GN according to a specific communication protocol as controlled by the server control unit 60.

The server storage unit 62 is nonvolatile memory and stores data.

As described above, the transaction system 1 produces paper receipts based on the transactions of customers of the business. A customer completing a transaction in this embodiment of the disclosure can also receive specific services from the control server 10 based on the transaction.

These specific services include, for example, awarding points according to the total purchase amount of the transaction or the purchased products, and producing electronic receipts. Producing an electronic receipt herein means displaying all or part of the information recorded on the paper receipt produced by the POS system 5 on the customer's terminal 14 or other device in response to a customer request.

For a server device such as the control server 10 to provide customers with specific services based on the customer's transaction, information related to the customer transaction and identification information (below, the customer ID) identifying the customer must be relationally stored on the server.

As described below, this embodiment of the disclosure makes this correlation using a function of the recording device 12. As a result, there is no need to provide the POS terminal 8 with a function dedicated to making this relationship as described further below.

Figure 3:
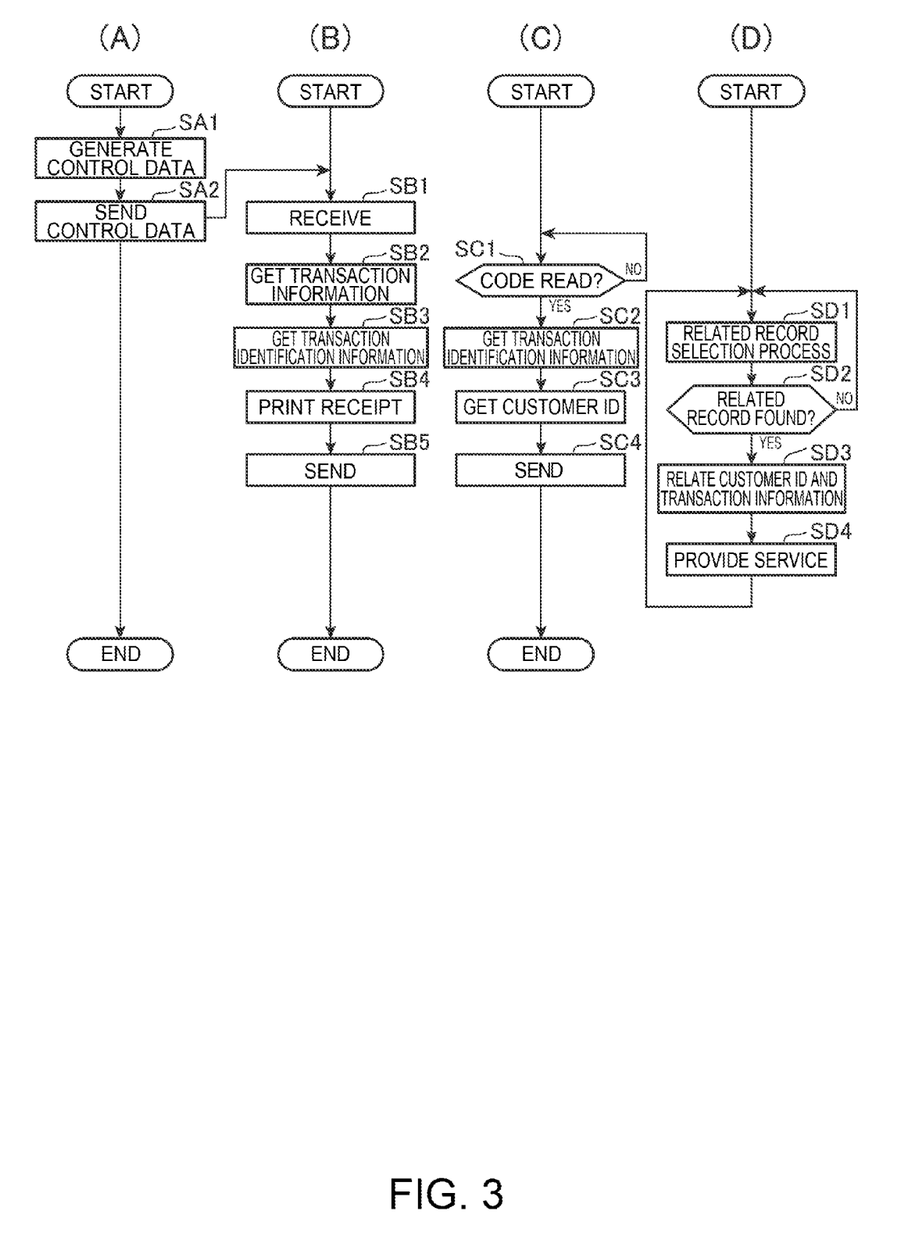
FIG. 3 is a flow chart of the operation of devices in the transaction system.

FIG. 3 is a flow chart of the operation of devices in the transaction system 1, (A) showing the operation of the POS terminal 8, (B) showing the operation of the recording device 12, (C) showing the operation of the terminal 14, and (D) showing the operation of the control server 10.

Transmitters that transmit beacon signals according to a specific protocol are installed at various places on the sales floor where the store system 11 is deployed. Each transmitter broadcasts a beacon signal at a specific period (such as every second). Multiple transmitters are placed around the sales floor so that the entire floor is covered by the beacon signals broadcast by the transmitters.

Identification information of the terminal application AP (referred to below as the application ID) is carried by the beacon signal broadcast by each transmitter.

When the beacon signal receiver 56 of the terminal 14 receives a beacon signal from a transmitter, the beacon signal receiver 56 outputs the application ID received in the beacon signal to the terminal control unit 50. When an application ID is input from the beacon signal receiver 56 while a specific application is not running, the terminal control unit 50 starts the specific application based on the application ID. The specific application can be started using a function of the operating system of the terminal 14.

While the application is running, the terminal application execution unit 50a monitors whether or not a beacon signal is not received for a continuous time exceeding a specific threshold based on input from the beacon signal receiver 56. By checking if the time that a beacon signal is not received continues for a specific time, the terminal application execution unit 50a can monitor whether or not the terminal 14 has moved off the sale floor.

If the time that a beacon signal is not received exceeds the specific threshold, the terminal application execution unit 50a aborts the application.

As a result, the application runs while the terminal 14 is on the sale floor. The terminal 14 therefore executes the process shown in FIG. 3 (C) while the terminal 14 is on the sale floor (while the customer is on a sale floor in the business).

As shown in FIG. 3 (A), the POS terminal 8 executes a payment process appropriately to the customer transaction, and generates control data based on the payment process (step SA1).

More specifically, the function blocks of the POS terminal 8 include a POS application execution unit that runs a POS application, and a printer driver execution unit that runs a printer driver.

The POS application execution unit generates receipt information including the information to print on a receipt according to the customer transaction. The receipt information is information including, for example, information related to a logo printed on the receipt; when the receipt is printed (date and time); information related to the names, prices, quantities, and applicable tax for the products the customer purchased; the purchase total; the amount received from the customer; the amount of change due; or other information. While not shown in the figures, a barcode reader that read barcodes from products or product packaging is connected to the POS terminal 8. When processing a transaction for a customer of the business, the POS application execution unit gets required information from product master and customer master databases by specific means as needed and generates the receipt information based on input from the barcode reader or input by the checkout clerk through a keypad or other input means.

After generating the receipt information, the printer driver execution unit generates control data, which is control data based on the command language of the recording device 12, instructing printing the receipt information.

Next, the POS terminal 8 sends the generated control data to the recording device 12 (step SA2).

As shown in FIG. 3 (B), the control unit 30 of the recording device 12 controls the communication interface 35 to receive the control data (step SB1).

Next, the control unit 30 acquires the transaction information based on the receipt information (step SB2). The transaction information is information related to the transaction extracted from the receipt information, and may include, for example, when the receipt was printed (date and time); information related to the names, prices, quantities, and applicable tax for the products the customer purchased; the purchase total; the amount received from the customer; the amount of change due; or other information.

Next, the control unit 30 generates and captures transaction identification information (step SB3). The transaction identification information is identification information for the transaction information acquired in step SB2, and is unique to each transaction information set.

Note that the transaction system 1 includes plural store systems 11, and the value of the transaction identification information generated by the recording device 12 is unique and different from the values of the transaction identification information generated by the recording devices 12 in all other store systems 11.

Next, the control unit 30 produces a receipt based on the control data and the transaction identification information acquired in step SB3 (step SB4).

More specifically, the control unit 30 controls the recording unit 31 based on the control data to record the receipt information on the roll paper. Next, the control unit 30 generates a two-dimensional code (code) representing the transaction identification information based on the transaction identification information acquired in step SB3, and controls the recording unit 31 to record the 2D code after printing the receipt information. Note that the control unit 30 has a function for generating a 2D code expressing specific information based on the specific information. Next, the control unit 30 cuts the roll paper at a position after the printed 2D code. This completes production of a receipt. The printed receipt thus contains the receipt information and a 2D code representing the transaction identification information. The checkout clerk then gives the printed receipt to the customer.

The control unit 30 then controls the network communication unit 37 to send the transaction information acquired in step SB2 and the transaction identification information acquired in step SB3 to the control server 10.

Note that the control unit 30 manages the information required for communication with the control server 10, such as the address of the control server 10. In step SB5, the control unit 30 establishes a connection with the control server 10 according to a specific communication protocol based on the managed information, and sends the information through the opened connection.

The control unit 30 stores the transmitted transaction information and transaction identification information in a specific storage area. While not shown in FIG. 3, when receiving the transaction information and transaction identification information is successful, the control server 10 sends data reporting successful reception through the opened connection to the recording device 12. When data reporting successful reception is received, the control unit 30 deletes the transaction information and the transaction identification information from the specific storage area. Deleting the data includes overwriting the area where the transaction information and transaction identification information are stored with other data.

Communication between the recording device 12 and control server 10 may be temporarily disabled due, for example, to a communication-related error, an error in a device related to communication, or other reason. Before transmitting the transaction information and transaction identification information, the control unit 30 determines if the data can be sent to the control server 10. This may include, for example, determining if a connection can be established, and requesting the control server 10 for a response and determining if a response is received within a specific time.

When information cannot be sent to the control server 10, the control unit 30 monitors if sending information to the control server 10 has become possible, and if data can be sent, sends the transaction information and transaction identification information stored in the specific storage area to the control server 10.

A situation in which the transaction information and transaction identification information is not sent to the control server 10 can be prevented by the recording device 12 running this process.

While not shown in FIG. 3, the control server 10 executes the following process when transaction information and transaction identification information are sent from the recording device 12.

The server control unit 60 of the control server 10 controls the server network communication unit 61 to receive the transaction information and transaction identification information.

Next, the server control unit 60 generates transaction time information. The transaction time information is information identifying the time of the transaction. In this embodiment of the disclosure, the time indicated by the information contained in the receipt information indicating when the receipt was produced is the time of the transaction. The time indicated by the transaction time information is not limited to the time the receipt was produced, and may be any time derived from the transaction.

Next, the server control unit 60 accesses a transaction-related information database 62*a* stored by the server storage unit 62.

Figure 4:
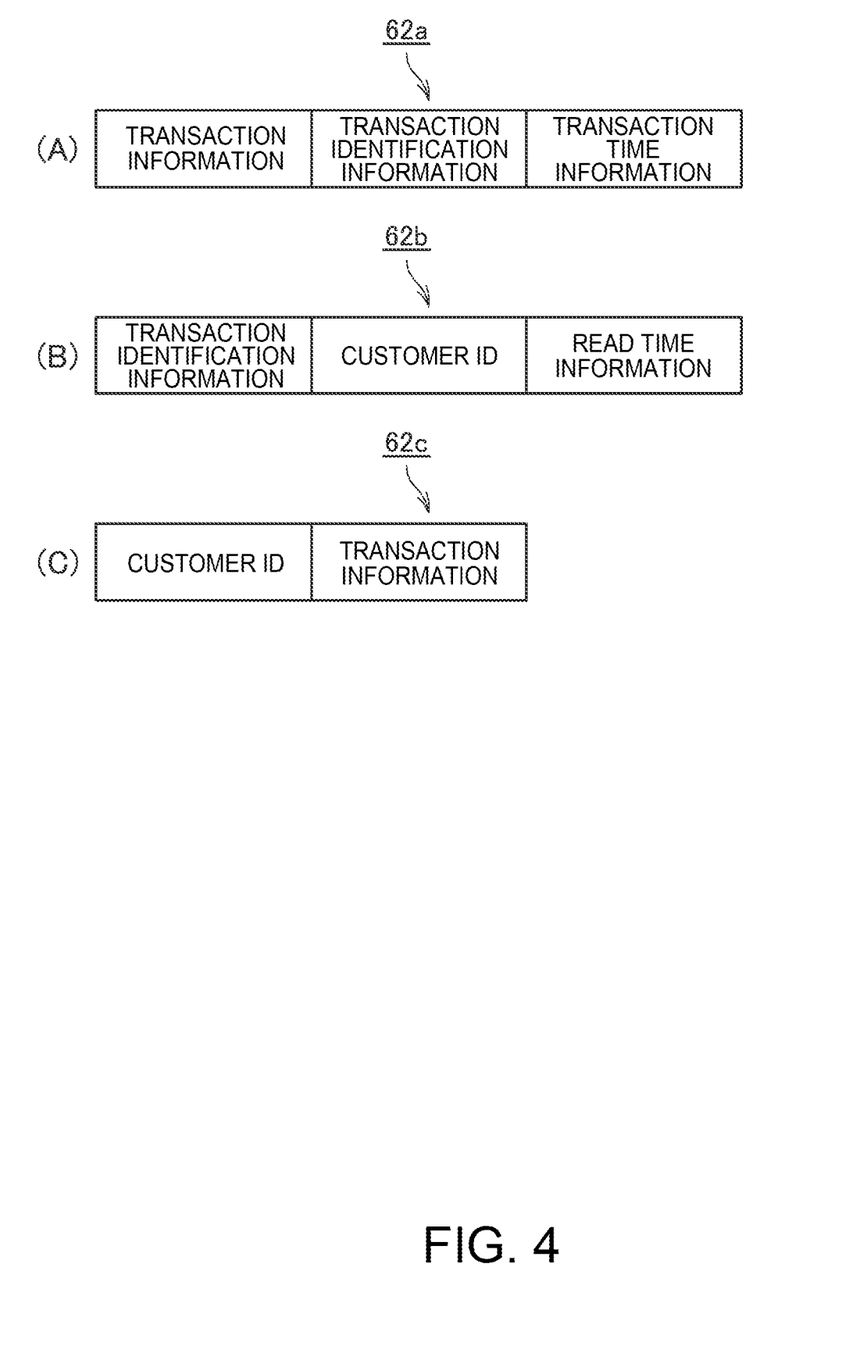
FIG. 4 illustrates the data structure of a database stored by the control server.

FIG. 4 (A) shows an example of the data structure of one record in the transaction-related information database 62*a*.

As shown in FIG. 4 (A), one record of the transaction-related information database 62*a* relationally stores the transaction information, transaction identification information, and transaction time information.

After accessing the transaction-related information database 62*a*, the server control unit 60 creates a record relating the received transaction information, transaction identification information, and generated transaction time information in the transaction-related information database 62*a*.

As a result of this process, a record relationally storing the transaction information, transaction identification information, and transaction time information is created according to the transaction completed at the POS system 5 in the transaction-related information database 62a of the control server 10.

When the customer making a transaction at the checkout counter desires to receive a particular service from the control server 10 based on the transaction (in this embodiment, a service awarding points based on the transaction), the customer executes the following steps.

First, the customer uses the camera 55 of the terminal 14 to take a picture of the 2D code recorded on the receipt received from the checkout clerk. The camera 55 outputs the image data captured from the picture to the terminal application execution unit 50a of the terminal control unit 50.

To receive a particular service, the customer is previously informed by a specific method to read the 2D code with the terminal 14 within a specific time (5 minutes in this example) after receiving the receipt. The customer may be so informed through a user interface provided by the terminal application execution unit 50a, by printing such instructions on the receipt, or by simply placing an instructional sign or notice at the checkout counter, for example.

Note that because the terminal application AP starts automatically when the terminal 14 is on a sales floor of the business (that is, when the customer is in the store), the customer does not need to do anything to start the terminal application AP.

As shown in FIG. 3 (C), the terminal application execution unit 50a then analyzes the image data input from the camera 55, and determines if image data for the 2D code is contained in the captured image data (step SC1).

If image data for the 2D code is contained (step SC1 returns YES), the terminal application execution unit 50a interprets the image data of the 2D code contained in the captured image data, reads the transaction identification information recorded in the 2D code, and thus acquires the transaction identification information (step SC2).

The terminal application execution unit 50a then acquires the customer ID (device identification information) (step SC3). The customer ID is previously recorded in a specific storage area so that it can be referenced by the terminal application execution unit 50a.

Next, the terminal application execution unit 50a controls the terminal network communication unit 53 and sends the transaction identification information acquired in step SC2 and the customer ID acquired in step SC3 to the control server 10 (step SC4).

The terminal application execution unit 50a manages the information required to communicate with the control server 10, such as the address of the control server 10. In step SC4, the terminal application execution unit 50a establishes a connection with the control server 10 according to a specific communication protocol based on the managed information, and sends the information through the opened connection.

While not shown in FIG. 3, the control server 10 executes the following process when the terminal 14 sends transaction identification information and a customer ID.

The server control unit 60 of the control server 10 controls the server network communication unit 61 to receive the transaction identification information and customer ID.

Next, the server control unit 60 produces read time information. The read time information is information indicating the time the 2D code was read by the terminal 14. Because the transaction identification information and customer ID are transmitted automatically when the 2D code is read in this embodiment, the control server 10 uses the time the transaction identification information and customer ID were received from the terminal 14 as the time the 2D code was read. Note that the time the 2D code is read is not limited to the time the information is received, and may be any time derived from reading the 2D code.

Next, the server control unit 60 accesses a customer-related information database 62b stored by the server storage unit 62.

FIG. 4 (B) shows an example of the data structure of one record in the customer-related information database 62b.

As shown in FIG. 4 (B), one record of the customer-related information database 62b stores the transaction identification information, customer ID, and read time information.

After accessing the customer-related information database 62b, the server control unit 60 creates a record relating the received transaction identification information, customer ID, and generated read time information in the customer-related information database 62b.

As a result of this process, when a 2D code containing the transaction identification information is read by the terminal 14, a record relationally storing the transaction identification information, customer ID, and read time information is created according to the read 2D code in the customer-related information database 62b of the control server 10.

In this example, the transaction information and transaction identification information transmitted by the recording device 12 in step SB5 are collectively referred to as transaction-related information.

The transaction identification information and customer ID transmitted by the terminal 14 in step SC4 are collectively referred to as customer-related information.

As shown in FIG. 3 (D), the server control unit 60 of the control server 10 executes a related record selection process (step SD1).

The related record selection process determines if there is a record created in the transaction-related information database 62a and a record created in the customer-related information database 62b that are related to each other.

A record in the transaction-related information database 62a and a record in the customer-related information database 62b are related to each other when the following condition is true. That is, if the transaction identification information in each record matches, and if the difference between the time indicated by the transaction time information in the record in the transaction-related information database 62a and the time indicated by the read time information in the record in the customer-related information database 62b is less than a specific threshold, the records are related.

Figure 5:
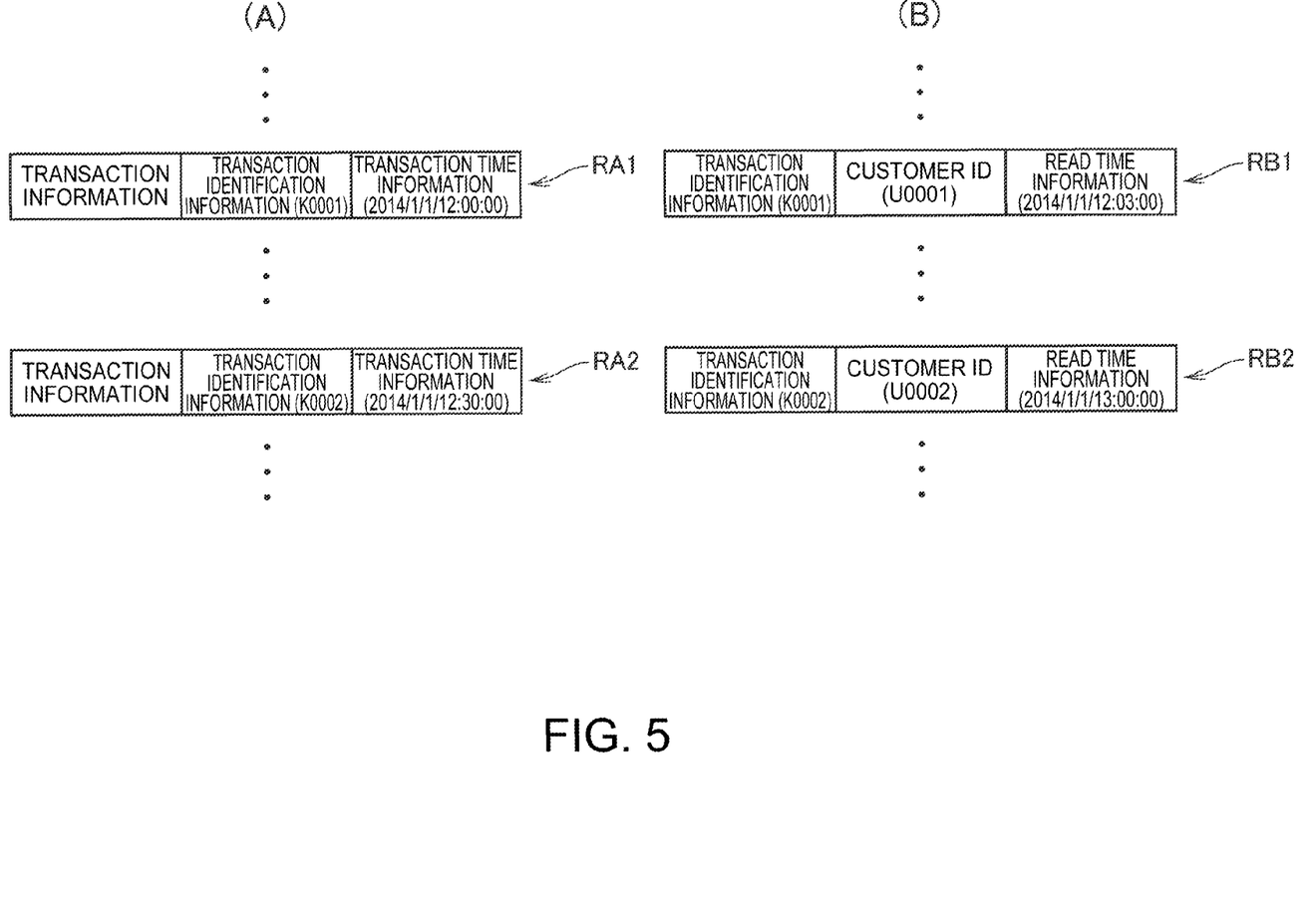
FIG. 5 is used to describe the related record selection process.

The related record selection process is described below with reference to FIG. 5. FIG. 5 (A) shows an example of the transaction-related information database 62a, and (B) shows an example of the customer-related information database 62b.

In the related record selection process described below with reference to FIG. 5, the specific threshold used in the related record selection process of step SD1 is 15 minutes.

As described above, the customer is told in advance by a specific method to read the 2D code with the terminal 14 within a specific time after receiving the receipt in order to receive a service. This specific threshold is a value corresponding to the specific time reported to the customer. More specifically, the specific time reported to the customer includes a certain margin of tolerance. For example, if the customer is instructed to read the 2D code within 5 minutes of receiving the receipt, the specific threshold may be set to 15 minutes to add a certain margin of tolerance to the 5 minute limit.

The value of the transaction identification information of record RA1 in FIG. 5 (A) is K0001, and the time indicated by the transaction time information is 2014/1/1/12:00:00. The value of the transaction identification information of record RB1 in FIG. 5 (B) is K0001, and the time indicated by the read time information is 2014/1/1/12:03:00. The transaction identification information values in record RA1 and record RB1 therefore match. The difference between the time indicated by the transaction time information in record RA1 and the time indicated by the read time information in record RB1 is less than 15 minutes (the specific threshold). The server control unit 60 therefore determines in the related record selection process that record RA1 and record RB1 are related.

The value of the transaction identification information of record RA2 in FIG. 5 (A) is K0002, and the time indicated by the transaction time information is 2014/1/1/12:30:00. The value of the transaction identification information of record RB1 in FIG. 5 (B) is K0002, and the time indicated by the read time information is 2014/1/1/13:00:00. The transaction identification information values in record RA2 and record RB2 therefore match. However, the difference between the time indicated by the transaction time information in record RA2 and the time indicated by the read time information in record RB2 is not less than 15 minutes (the specific threshold). The server control unit 60 therefore determines in the related record selection process that record RA2 and record RB2 are not related.

Records with matching transaction identification information in the transaction-related information database 62a and customer-related information database 62b are related because both records are created based on a common transaction.

The records in the transaction-related information database 62a and customer-related information database 62b determined to be related by the related record selection process of step SD1 are the records processed in step SD2 and step SD3 described below. These records are also managed so that they will not again be determined to be related records by the related record selection process. As a result, the record in the transaction-related information database 62a and the record in the customer-related information database 62b are prevented from being processed multiple times by step SD2 and step SD3.

As shown in FIG. 3 (D), while running the related record selection process, the server control unit 60 determines if there is a record in the transaction-related information database 62a and a record in the customer-related information database 62b that are determined to be related by the related record selection process (step SD2).

Below, the record in the transaction-related information database 62a and the record in the customer-related information database 62b that are determined to be related are referred to as the "related transaction record" in the case of the record in the transaction-related information database 62a, and the "related customer record" in the case of the customer-related information database 62b.

If there is a record in the transaction-related information database 62a (related transaction record) and a record in the customer-related information database 62b (related customer record) that are determined to be related (step SD2 returns YES), the server control unit 60 executes the following process.

More specifically, the server control unit 60 creates one record in the customer/transaction information database 62c stored by the server storage unit 62. The server control unit 60 then relationally stores the transaction information from the related transaction record and the customer ID from the related customer record in the created record (step SD3).

FIG. 4 (C) shows an example of the data structure of one record in the customer/transaction information database 62c.

As shown in FIG. 4 (C), one record of the customer/transaction information database 62c stores the customer ID and transaction information.

Each record in the customer/transaction information database 62d relationally stores for a customer making a transaction at a checkout counter the customer ID of the customer and transaction information related to the transaction completed by the customer.

Next, the server control unit 60 provides a service to the customer based on the record created in the customer/transaction information database 62c in step SD4.

In this example, the service is awarding points. An example of a process for awarding points is described below.

The server control unit 60 stores a database relationally storing a customer ID with the balance of points owned by the customer. How many points are awarded is previously set according to the total purchase amount of the transaction. Based on the transaction information, the server control unit 60 gets the total purchase amount of the transaction and determines how many points to award based on the acquired total purchase amount. Next, the server control unit 60 accesses the database, finds the matching record using the customer ID as the search key, and increases the balance of points in the identified record according to the number of points awarded.

Note that the service provided by the control server 10 is not limited to this example. Because the customer ID and transaction information are relationally stored in step SD3, this information can be used to provide various services. For example, in addition to issuing an electronic receipt as described above, coupons may be issued or advertising or product information may be provided according to the products purchased in the transaction.

Furthermore, because the customer ID and transaction information are relationally stored in step SD3, transactions can be analyzed by individual customers, and services based on the result of the analysis can be provided.

In this embodiment of the disclosure, even if the transaction identification information matches in the related record selection process, the records are not determined to be related if the difference between the time indicated by the transaction time information of the record in the transaction-related information database 62a and the time indicated by the read time information of the record in the customer-related information database 62b is not less than the specific threshold. These records are therefore not processed in step SD3 and step SD4, the transaction information and the customer ID from these records is not relationally stored, and no service is provided. The reason for this is described below.

In this event, the time past between the first transaction and when the 2D code printed on the receipt issued for the first transaction was read exceeds the time allowed for the customer to read the 2D code. As a result, someone other than the person that made the transaction may have acquired a discarded receipt and read the 2D code. By including this process in the related record selection process, providing a service to a third party can be prevented when the 2D code is read by a third party.

The control server 10 may also execute the following process.

The server control unit 60 of the control server 10 monitors the customer-related information database 62b, and determines if multiple records with the same customer ID are created within a specific time. By executing this process, the server control unit 60 can determine if the same person scanned the 2D code printed on multiple receipts within a short period of time.

If the same person scans the 2D code printed on multiple receipts continuously within a short period of time, that person may have collected plural receipts discarded by other people and consecutively scanned the 2D codes on those receipts. If plural records with the same customer ID are determined to have been created within a specific time, the control server 10 executes a handling process.

This handling process may be reporting the same to a manager in the store where the transactions were made. The manager in the store may be informed by, for example, sending e-mail or notifying the server (not shown in the figure) that manages the store system 11 in that business. By informing a manager in the business, the manager can know that the 2D code printed on multiple receipts may have been scanned by a person other than who made the transaction, and based on this knowledge can take appropriate action. The handling process may also be a process that determines the plural records with the same customer ID created within a specific time are not records to be evaluated in the related record selection process to determine if they are related.

As described above, a transaction system 1 according to this embodiment has a POS terminal 8, a recording device 12 (processing device), a terminal 14, and a control server 10 (control device).

During a transaction, the POS terminal 8 sends control data instructing executing a transaction-related process.

The recording device 12 receives the control data from the POS terminal 8, runs a process based on the control data, transmits transaction information based on the control data and transaction identification information identifying the transaction information, and outputs a 2D code (code) representing the transaction identification information.

The terminal 14 reads the transaction identification information from the 2D code output by the recording device 12, and transmits the read transaction identification information and the customer ID (device identification information), which is identification information to store.

The control server 10 receives the transaction information and the transaction identification information from the recording device 12, receives the transaction identification information and customer ID from the terminal 14, and relationally stores the transaction information and customer ID if the transaction identification information received from the recording device 12 and the transaction identification information received from the terminal 14 match.

Thus comprised, by sending transaction information and transaction identification information from the recording device 12 to the control server 10, the control server 10 can relate the customer ID and transaction information without the POS terminal 8 sending the transaction information and transaction identification information to the control server 10. As a result, transaction information (information related to a transaction) and specific identification information (a customer ID) can be related without providing the POS terminal 8 with a dedicated function (or device).

The recording device 12 according to this embodiment has a recording unit 31, and outputs the 2D code by printing it with the recording unit 31.

Thus comprised, the recording device 12 can use the recording unit 31 to output the 2D code.

When the recording device 12 according to this embodiment cannot send the transaction information and transaction identification information to the control server 10, the recording device 12 stores the transaction information and transaction identification information and sends it when communication is possible.

Thus comprised, if sending information to the control server 10 is temporarily disabled, the recording device 12 can send the information when communication is established again.

The control server 10 according to this embodiment executes a specific process corresponding to the transaction based on the relationally stored transaction information and customer ID.

Thus comprised, the control server 10 can execute a process appropriate to the transaction based on the relationally stored transaction information and customer ID.

The disclosure is described above with reference to a preferred embodiment thereof, but the disclosure is not limited thereto and can be modified and adapted in many ways without departing from the scope of the accompanying claims.

For example, the recording device 12 in the foregoing embodiment outputs the 2D code by printing it with the recording unit 31. However, the recording device 12 may be configured to output the 2D code by displaying it on the display unit 39. In this event, the customer can read the 2D code displayed on the display unit 39 with the terminal 14 when the service is desired.

The recording device 12 in the foregoing embodiment does not send the control data to the control server 10, but may be configured to send the control data to the control server 10. In this event, the control server 10 relationally stores the customer ID, transaction information, and control data when a specific condition is met. This configuration enables providing a service using the control data, or analyzing the purchasing pattern of a particular customer ID.

In the foregoing embodiments the terminal 14 determines if the terminal 14 is on a sales floor using beacon signals that are transmitted from transmitters on the sales floor of the store. However, the terminal 14 may manage areas on the sales floor of a store, and based on the location of the terminal 14 and the areas on the sales floor in the store, determine if the terminal 14 is on a sales floor in the store. The location of the terminal 14 may also be determined by location detecting using GPS signals.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A transaction system comprising:
   a POS terminal configured to transmit control data to a processing device instructing the processing device to execute a transaction-related process;
   the processing device configured to:
   receive the control data from the POS terminal,
   execute the transaction-related process based on the control data,
   extract transaction information from the control data,
   generate transaction identification information that identifies the transaction information, transmit, to a control device, the transaction information and the transaction identification information, and output a code that encodes the transaction identification information;

a terminal configured to:
  store device identification information in memory of the terminal,
  read the code,
  extract the transaction identification information from the code, and
  transmit to the control device the transaction identification information and device identification information; and the control device configured to:
  receive from the processing device and store in memory of the control device, as first associated information, the transaction information and transaction identification information,
  extract transaction time information from the transaction information,
  receive from the terminal and store in memory, as second associated information, the transaction identification information and device identification information,
  generate or receive read-time information related to the transaction identification information and device identification information received from the terminal,
  match the transaction identification information of the first associated information and the transaction identification information of the second associated information,
  determine, based on the transaction time information and the read-time information, that a difference in transaction time and read time is within a predetermined range,
  store in the memory of the control device, as associated, the transaction information and the device identification information responsive to the matching the transaction identification information and the determining that the difference in transaction time and read time is within the predetermined range, and
  provide a service based on the associated transaction information and device identification information.

2. The transaction system described in claim 1, wherein:
the processing device has a recording unit configured to record and thereby output the code.

3. The transaction system described in claim 1, wherein:
the processing device has a display unit configured to display information and thereby output the code.

4. The transaction system described in claim 1, wherein:
the processing device is configured to store the transaction information and transaction identification information when the transaction information and transaction identification information cannot be transmitted to the control device, and to transmit the transaction information and transaction identification information when transmission is enabled.

5. The transaction system described in claim 1, wherein:
the control device is configured to execute a specific process appropriate to the transaction to provide the service based on the transaction information and device identification information.

6. An information processing method, comprising:
a POS terminal transmitting control data to a processing device instructing the processing device to execute a transaction-related process;

the processing device receiving the control data from the POS terminal, executing the transaction-related process based on the control data, extracting transaction information from the control data, generating transaction identification information that identifies the transaction information, transmitting the transaction information and the transaction identification information, and outputting a code that encodes the transaction identification information;

a terminal storing device identification information, reading the code, extracting the transaction identification information from the code, and transmitting, to a control device, the transaction identification information and device identification information; and the control device receiving and storing, as first associate information, the transaction information and transaction identification information from the processing device, extracting transaction time information from the transaction information, receiving the transaction identification information and device identification information from the terminal, generating or receiving the read-time information related to the transaction identification information and device identification information received from the terminal, matching the transaction identification information of the first associated information and the transaction identification information of the second associated information, determining, based on the transaction time information and the read-time information, that a difference in transaction time and read time is within a predetermined range, storing, as associated, the transaction information and the device identification information responsive to the matching the transaction identification information and the determining that the difference in transaction time and read time is within the predetermined range, and providing a service based on the transaction information and the device identification information.

7. The information processing method described in claim 6, wherein:
the processing device records the code.

8. The information processing method described in claim 6, wherein:
the processing device outputting the code comprises displaying the code.

9. The information processing method described in claim 6, wherein:
the processing device stores the transaction information and transaction identification information when the transaction information and transaction identification information cannot be transmitted to the control device, and transmits the transaction information and transaction identification information when transmission is enabled.

10. The information processing method described in claim 6, wherein:
the control device providing a service comprises executing a specific process appropriate to the transaction based on the transaction information and device identification information.

* * * * *